United States Patent
Schwab

(10) Patent No.: US 6,239,929 B1
(45) Date of Patent: May 29, 2001

(54) COMBINED HIGH-SPEED CONTACT MAGNETIC TAPE DUPLICATOR AND CASSETTE LOADER

(75) Inventor: Barry H. Schwab, West Bloomfield, MI (US)

(73) Assignee: Videa, LLC, Ann Arbor, MI (US)

( * ) Notice: Subject to any disclaimer, the term of this patent is extended or adjusted under 35 U.S.C. 154(b) by 0 days.

(21) Appl. No.: 08/273,251

(22) Filed: Jul. 11, 1994

Related U.S. Application Data

(63) Continuation-in-part of application No. 08/008,655, filed on Jan. 25, 1993, now abandoned.

(51) Int. Cl.[7] .................................................. G11B 5/86
(52) U.S. Cl. .............................................. 360/16; 360/59
(58) Field of Search ................................. 360/15, 16, 17, 360/59

(56) References Cited

U.S. PATENT DOCUMENTS

| | | | |
|---|---|---|---|
| 2,738,383 | 3/1956 | Herr et al. | 360/76 |
| 3,633,807 | 1/1972 | Williams | 226/97 |
| 3,864,732 | 2/1975 | Grindley et al. | 360/15 |
| 3,893,167 | 7/1975 | Stahler | 360/16 |
| 4,061,286 | 12/1977 | King, Sr. et al. | 242/56 R |
| 4,657,197 | 4/1987 | Farrow | 242/56 R |
| 4,698,700 | 10/1987 | Shirai | 360/16 |
| 4,752,842 | 6/1988 | Odagiri | 360/74 |
| 4,768,107 | 8/1988 | Kobaiashi et al. | 360/17 |
| 4,814,899 | 3/1989 | Gantzhorn, Jr. et al. | 360/16 |
| 4,819,102 | 4/1989 | Shirai et al. | 360/17 |
| 4,843,487 | 6/1989 | Gantzhorn et al. | 360/17 |
| 4,860,126 | 8/1989 | Sota | 360/16 |
| 4,868,688 | 9/1989 | Nagaoka et al. | 360/16 |
| 4,882,636 | 11/1989 | Billings et al. | 360/16 |
| 4,974,100 | 11/1990 | Odaka et al. | 360/15 X |
| 4,979,691 | 12/1990 | Kohayashi et al. | 242/75 |
| 5,095,390 | 3/1992 | Nagaoka et al. | 360/16 |

FOREIGN PATENT DOCUMENTS

404061027 * 2/1992 (JP) ........................................ 360/16

OTHER PUBLICATIONS

High tree Media Corp. Brochure "Highstress Media Redefines High–Speed VHS Duplication" Aug. 1993.

Hightree Media Corp. Brochure "Hightree Media Redefines High–Speed VHS Duplication" 8/93.

* cited by examiner

Primary Examiner—Andrew L. Sniezek
(74) Attorney, Agent, or Firm—Gifford, Krass, Groh, Sprinkle, Anderson & Citkowski, PC

(57) ABSTRACT

A single machine combines both a high-speed magnetic tape duplication apparatus and a cassette loader. The duplicator may accommodate either anhysteretic or thermo-magnetic transfer, and the master tape transport mechanism may function either in a shuttle or a bin-loop mode. In an alternative embodiment of the invention, a single master tape is threaded through multiple transfer heads, each head being fed from a separate pancake-type copy-tape supply reel and routed into dedicated cassette loading stations to multiple system throughput.

20 Claims, 2 Drawing Sheets

COMBINED HIGH-SPEED CONTACT MAGNETIC TAPE DUPLICATOR AND CASSETTE LOADER

PRIOR APPLICATION

This application is a continuation-in-part of application Ser. No. 08/008,655, filed Jan. 25, 1993, now abandoned.

FIELD OF THE INVENTION

The present invention relates to magnetic tape duplication and, in particular, to a machine capable of simultaneous high-speed duplication and cassette loading.

BACKGROUND OF THE INVENTION

In the production of magnetic-tape cassettes, such as video cassettes, heretofore, two separate types of equipment have been utilized: tape duplication machines and separate cassette loading machines. In terms of duplication, such machines fall into two categories, conventional "real-time" duplication and "high-speed" duplication. With the former, an unrecorded or blank cassette is recorded using either a professional or consumer-type video cassette recorder at a speed no faster than that which would be used to view the tape. With high-speed duplication, on the other hand, a transfer process is used to copy the magnetically encoded pattern from the master directly to the copy tape at speeds much faster than would be used for viewing. Of the high-speed transfer processes available, the anhysteretic and thermo-magnetic processes are the most common.

As for cassette loading, with real-time duplication, the cassettes are loaded before duplication. When high-speed duplication is used, however a separate machine is required to accept copy tape collected on large "pancakes" and to load sections of this tape into blank cassettes. Such machines are capable of detecting the unrecorded spaces between the programs on the bulk reels, and then separating them into individual finished cassettes.

Although there has never been a single machine which performs both high speed duplication and cassette loading, many efficiencies could be realized if these two operations were to be combined, including more efficient material handling, reduced labor and increased ability to accommodate potential order mixes.

SUMMARY OF THE PRESENT INVENTION

The present invention combines a high-speed magnetic-tape duplicator and a cassette loader in a single machine. Half-inch, 8-mm and audio tapes, and VHS cassettes, may be used. The duplicator may rely on either the anhysteretic process or the thermo-magnetic process to transfer a magnetically encoded pattern present on a master tape to a copy tape, and includes direct-contact heat-transfer processes. The invention includes a master tape transport mechanism operative to guide the master tape to and from the duplication facilities and a copy tape transport mechanism to guide copy tape to and from the duplicator. A cassette loading station is operative to receive copy tape during the transfer process and to load this copy tape into a cassette.

The master tape transport mechanism may function either in a shuttle mode; that is, fed from a supply reel onto a take-up reel during tape copying and rewound between transfer operations, or, alternatively, in a bin-loop mode, wherein the master tape is stored as a continuous loop in a supply bin until required for the transfer process.

The machine accepts copy tape on large pancake type reels. In the preferred embodiment, there are two such reels, and a splicing mechanism used to swap reels when one has been emptied. Also in the preferred embodiment, a copy tape take-up reel is used to collect excess copy tape prior to the start of cassette duplication on a new pancake of copy tape; a second splicer mechanism is used to cut the copy tape and splice it onto a supply-reel leader provided within the blank cassette. Once loaded, the cassette may be ejected, such as onto a conveyor belt, and a new blank cassette introduced and staged for the next loading operation.

In an alternative embodiment of the present invention, a single master tape is threaded past a plurality of transfer heads, each head being fed with copy tape from a separate supply reel, and each copy tape having the magnetically encoded pattern from the master transferred thereupon, and feeding a separate cassette loading station. In all embodiments, means are included to clean and regulate the tension of both the master tape and any copy tapes provided. Also, the machine allows copy tape to move directly from a supply reel and into the cassette loading station without engaging the duplicator. In this way, the machine may be used simply as a cassette loader, drawing blank or previously recorded tape from pancakes and into cassettes without duplicating.

Other advantages and applications of the present invention will be made clear by the following detailed description of a preferred embodiment of the invention. The description makes reference to the accompanying drawings.

DETAILED DESCRIPTION OF THE PREFERRED EMBODIMENT

Figure 1:
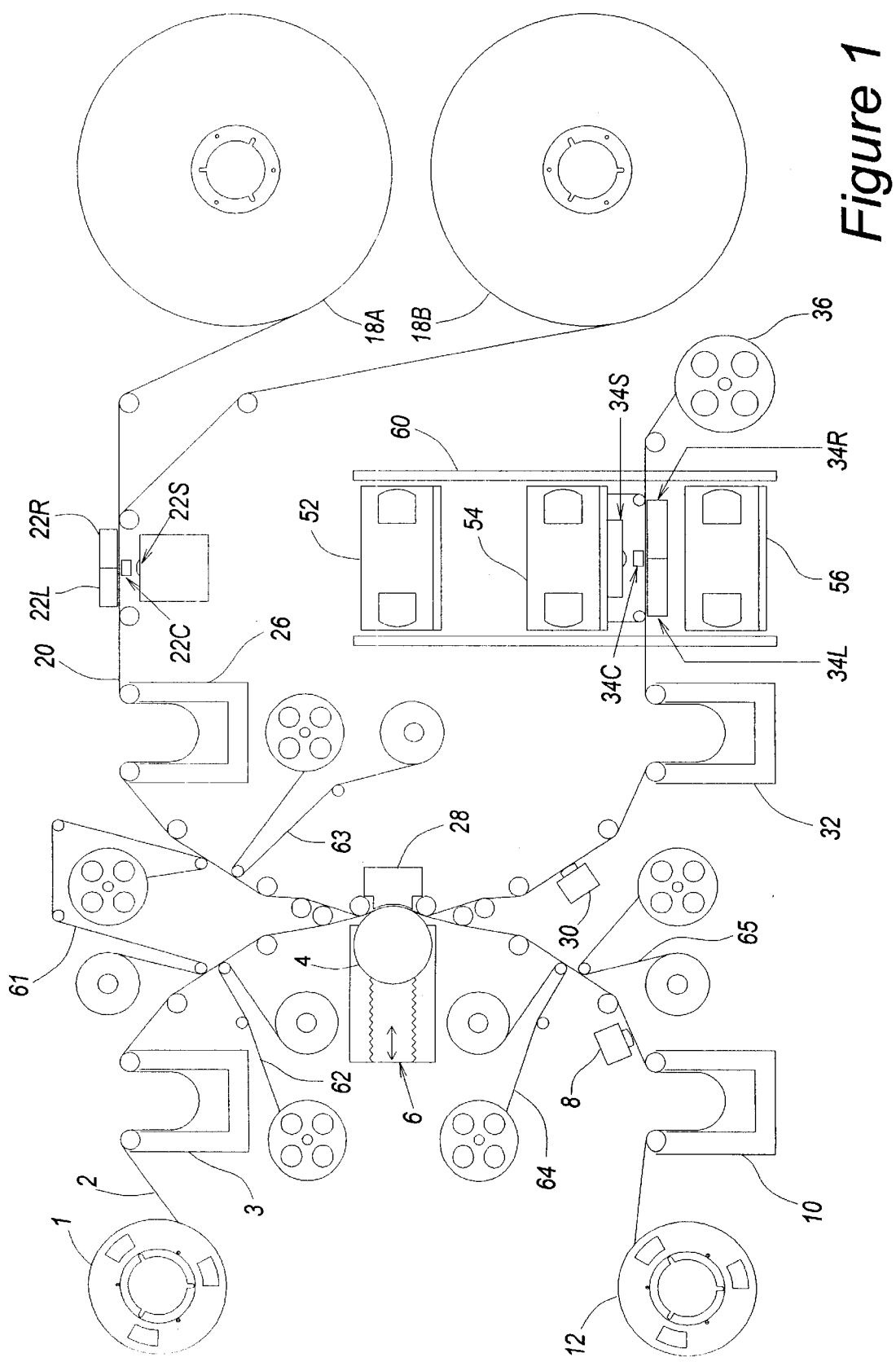
FIG. 1 is a semi-schematic diagram of a preferred embodiment of the invention illustrating master and copy tape paths with the transfer head engaged and duplication in progress.

FIG. 1 illustrates a preferred configuration of master and copy tape guiding and handling components used to implement the present invention. Exact placement of the various elements may be adjusted to best accommodate the particular configuration of loading and duplicating modules used in a particular design. Half-inch, 8-mm and audio tapes, and VHS cassettes, may be used. A master tape, 2, is provided on a master-tape supply reel, 1, in the form of a mirror-master tape. Such a mirror tape is required, since, in high speed duplication of helical-scan video recordings the master and copy are compressed with magnetized sides faces one another. Overall, master tape 2 is threaded past various rollers and guides, past transfer drum 4 and collected onto take-up reel 12. Along this path, tape tension regulators 3 and 10 are utilized to maintain consistent tension of the master tape before and after duplication, respectively, and cleaning tapes 61, 62, 64 and 65 are used to clean the master tape before and after tape transfer. Again, the exact positioning of master and copy tape tension regulators and cleaning tapes may be adjusted in accordance with particular demands for the physical layout. Also, although vacuum-column tape tension regulators are shown throughout, other tension regulation methods may be employed, including various kinds of mechanical regulators.

In the preferred embodiment, the duplication method employed is the anhysteretic process, wherein a bias magnetic field is supplied by a head, 28, as the master tape 2 is compressed against a copy tape over drum 4, which is held against transfer head 28 by retractor 6. The anhysteretic process, well known in the high-speed tape duplication industry, utilizes a magnetic field which is strong enough to orient the magnetization of the copy tape in accordance with a master tape, but not strong enough to demagnetize the master. In an alternative embodiment of the present invention, a thermo-magnetic transfer process may be used, wherein an elevated localized temperature gradient is used in lieu of a magnetic field to transfer the magnetically encoded pattern from the master to a suitable copy tape. Other alternative embodiments of the present invention may take advantage of high-speed video tape duplication methods and apparatus not requiring a transfer drum, such as the direct contact heat transfer (DCHT) technology developed by Hightree Media Corporation of El Segundo, Calif. In accordance with this method, which may be considered a variant of the thermo-magnetic process, a physically very small heating element makes direct contact to the oxide side of the copy tape as it passes through the duplication apparatus, this heater element raising the temperature of the magnetic coding to its Curie point. The heated copy tape then immediately passes into a capstan/pinch-roller assembly where it is held in intimate and substantially slip-free contact with a mirror-image master tape, whereupon the magnetization pattern of the master is transferred in non-mirror form to the copy tape as it cools. Tension of the master and copy tapes is controlled by a two-chamber tape-guide/tension-control, in which the tape is wrapped around a portion of the guide so as to cover two sets of holes, each leading to an independent chamber. The tape first passes over a set of holes leading to a vacuum chamber, then over the second set of holes, which leads to a pressurization chamber. The effect is to pull back on the tape over the vacuum holes, and blow the tape away from the guide using the pressure holes. Tension control is effected by changing the absolute and relative values of the vacuum and pressure. Again, although this particular high-speed transfer method does not rely upon a transfer drum, the present invention may nevertheless employe it or any other technique of sufficiently high throughput, in which case the transfer head 28 and retractor 6 shown in the figures would simply be replaced by the appropriate duplication components, perhaps with the addition of appropriate guides to control overall tape spacing in accordance with transfer and non-transfer modes of operation. Other operational aspects of the invention would remain consistent regardless of the duplication process used, for example, cassette loading would continue to operate as described, as would the automatic threading operations, which will be described subsequently.

On the copy tape side of the machine, a copy tape 20 is threaded from either supply pancake 22a or 22b, having been spliced onto the end of a tape from one of the pancakes utilizing a cutter 22c and splicer 22s. Copy tape 20 proceeds past tension regulator 26, tissue tape cleaning reels 61 and 63 and past bias-field magnetic head 28, where it is compressed against master tape 2, which in turn is compressed against transfer drum 4. From the duplication device, copy tape 20 is threaded past a control-track re-record magnetic head 30, tension regulator 32, and into the cassette loading station, indicated generally at 60. As with the master-tape transport mechanism, the exact placement of copy tape cleaning reels and tape-tension regulators is adjustable in accordance with the physical demands of layout.

In the cassette loading station 60, copy tape is wound onto the supply-side reel contained within the empty cassette. When this reel contains an entire cassette program, which may be determined by master-tape tone detector 8, the copy tape transport mechanism is temporarily halted and the copy tape is cut at splicer 34, and spliced onto a leader tape attached to a take-up reel contained within the empty cassette. Once the copy tape is spliced to this leader, the supply reel is automatically rotated, pulling the leader and copy tape into the cassette.

FIG. 1 shows three cassettes in the cassette loader 60. Cassette 52 has been introduced and is ready to drop into position 54, once the cassette shown at position 54 has been loaded with tape from pancakes 22A or 22B. After loading, tape 54 falls to position 56, and from there it is ejected from the machine to be received by a bin or conveyor belt.

Figure 2:
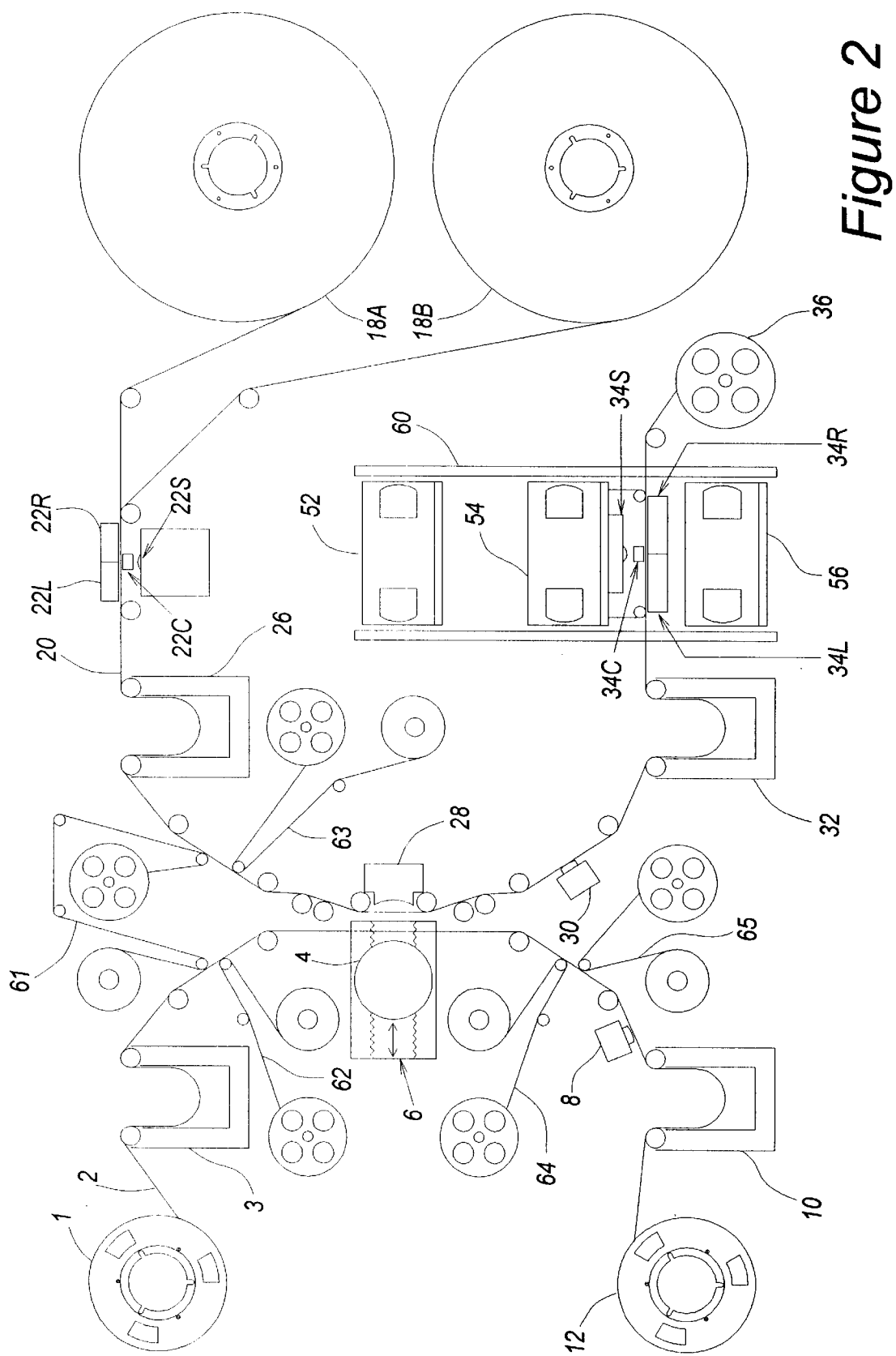
FIG. 2 illustrates the master and copy tape paths with the transfer head retracted.

Referring to FIG. 2, retractor 6 has been used to pull transfer drum 4 away from master tape 2. In this configuration, the master tape may be rewound onto supply reel 1 without touching the copy tape, and, copy tape may be drawn from either pancake 22a or 22b and wound onto the supply-side reel contained within the cassette, allowing the machine to function as a simple cassette loader.

The present invention is not constrained to use a shuttle mode of operation. Master tape supply reels 1 and 12, may be replaced or augmented with a master-tape supply bin (not shown). With this configuration, after the master tape has been threaded through the master-tape transport mechanism, the two ends of the master tape are spliced to form a continuous loop, with the bulk of the master tape being contained in a supply bin until needed for active duplication. Moreover, while the preferred embodiment of FIG. 1 shows a single transfer point, multiple duplicators may be positioned along a single master tape. In this alternative embodiment, copy tape for each transfer point would be drawn from a separate supply pancake, and into a separate cassette loading station, thereby multiplying overall machine duplication and loading efficiency.

In operation, a supply reel 1 containing a mirror master tape 2 is mounted onto the machine along with take-up reel 12. The master tape is threaded through tape regulator 3, cleaning tape 61 and 62, through the duplicator area with transfer drum 4 retracted with retractor 6, past cleaning tapes 64 and 65, tone detector 8, tension regulator 10 and attached to reel 12. Similarly, copy tape is supplied on a pancake either at 22a or 22b and, if not previously threaded through the mechanism, copy tape 20 is threaded past tension regulator 26, cleaning tapes 61 and 63, past transfer head 28 with drum 4 retracted using retractor 6, through guides and across control-track re-record magnetic head 30, past tension regulator 32 and into the cassette loading station. If the copy tape has been previously threaded in this manner, copy tape from a new pancake may be added by attaching it to the previously threaded copy tape, utilizing cutter and splicer 22c and 22s, respectively. The tape can then be spliced at splicer mechanism 34 onto tape on the take-up reel 36, and advanced until the splice from station 22 is pulled completely through the mechanism to reel 36. The copy tape is then cut by splicer mechanism 34 and spliced to the supply-side leader tape of the next cassette.

With a master tape and a copy tape appropriately threaded, retractor 6 is used to compress master tape 2 against copy tape 20 using transfer drum 4 which then rotates, drawing the compressed master and copy tapes past transfer head 28 which duplicates a mirror image of the master tape magnetization pattern onto the copy tape. During the transfer process, the supply-side reel contained within the cassette winds the copy tape until the end of the program material on the master is detected by cue-tone detector 8. At this point, transfer drum 4 is retracted, the copy tape is cut and spliced onto the leader in the empty cassette, and copy tape is wound into the cassette as previously described. If the unit is operating in a shuttle mode, with transfer drum 4 retracted supply reel 1 may now rewind the master tape from take-up reel 12. With the cassette loaded, it drops from the system, a new cassette is staged at position 54, its supply-side leader tape is spliced onto the cut copy tape, the transfer drum presses the rewound master tape against the copy tape and the process repeats, until another cassette is loaded. If the system is operating in the bin-loop mode, the master tape will require no rewinding, as it may be spliced to automatically cue it up for the next duplication cycle.

Although not depicted in the figures, an alternative embodiment of the invention may include a loop-bin tape accumulator mechanism disposed in the tape path between the duplication means and the cassette loader receiving tape therefrom. This loop-bin would be constructed similarly to the types of bins known in the art to contain a master tape as previously described, but the function of this accumulator is broadly defined as to collect tape during active duplication and function as a tape buffer enabling the rate of tape being fed into the accumulator and retrieved from the accumulator to be asynchronous, which may prove advantageous for various modes of operation. For example, such an accumulator could be used to enable loading to continue while the master tape is being rewound, for example, during shuttle mode. It may also be used to collect tape for temporary periods should problems arise in the cassette loader or, broadly speaking, to tape up slack whenever speed of duplication is not matched with that of the cassette loader, for whatever reason. Although the present invention anticipates that the rate of duplication and cassette loading will be generally comparable, the accumulator capacity need not be excessive for such a general purpose, though accumulators capable of holding tape representative of an entire program may be envisioned. In terms of hardware, this accumulator consists of a dust-free compartment having motor-driven tape-movement means at an input and output of the compartment, and if the tape input exceeds the rate of tape output, the compartment is designed such that the duplicated copy tape will simply accumulate, preferably in accordion fashion, within the compartment. Motorized pinch rollers may be used to drive tape into and out of this compartment, and tension regulators may further be provided on either side of the compartment, or on both sides of the compartment, to ensure that tape handling is appropriate so as to avoid damage.

Having thus described my invention, I claim:
What is claimed is:

1. A combined high-speed magnetic tape duplicator and cassette loader, comprising:
   a transfer mechanism operative to place a magnetic mirror-master tape and a magnetic copy tape in intimate and substantially slip-free contact, said mirror-master tape having a helically-scanned pattern magnetically encoded thereupon, said transfer mechanism including contact duplication means operative to transfer said magnetically encoded pattern to said magnetic copy tape without electronically re-recording said pattern from the mirror-master tape;
   a master tape transport mechanism operative to receive said mirror master tape and guide said master tape to and from said duplication means;
   a copy tape transport mechanism including one or more pancake-type supply reels, said copy tape transport mechanism being operative to receive said magnetic copy tape and guide said copy tape to and from said duplication means; and
   a cassette loading station operative to perform the following functions:
   a) receive an empty cassette shell at a first position,
   b) transfer said empty shell into a second position different from said first position for the purpose of loading said empty cassette shell,
   c) receive duplicated copy tape in a continuous path directly from said duplication means and wind said duplicated copy tape into said cassette shell, the longitudinal centerline of said copy tape at all times residing substantially within the same, and
   d) eject said cassette shell with said duplicated copy tape loaded therein to a third position different from said first and second positions; and
   means to detect a signal previously recorded on said master tape, the operation of said cassette loading station being a function of the detection of said signal.

2. The combined magnetic tape duplicator and cassette loader of claim 1 wherein said duplication means is operative to transfer said magnetically encoded pattern through an anhysteretic process.

3. The combined magnetic tape duplicator and cassette loader of claim 1 wherein said duplication means is operative to transfer said magnetically encoded pattern through a thermo-magnetic process.

4. The combined magnetic tape duplicator and cassette loader of claim 3 wherein said thermo-magnetic process utilizes a direct contact heat transfer technology.

5. The combined magnetic tape duplicator and cassette loader of claim 1 wherein said master tape transport mechanism functions in a shuttle mode.

6. The combined magnetic tape duplicator and cassette loader of claim 1 wherein said master tape transport mechanism functions in a bin-loop mode.

7. The combined magnetic tape duplicator and cassette loader of claim 1 wherein said copy tape transport mechanism further includes a splicing mechanism operative to splice the tape from any of said pancake-type supply reels onto copy tape previously threaded to and from said duplication means.

8. The combined magnetic tape duplicator and cassette loader of claim 1, said cassette shell loading station further including a splicing mechanism operative to cut the copy tape as duplicated and splice it onto a leader tape provided in said cassette.

9. The combined magnetic tape duplicator and cassette loader of claim 1 including a plurality of duplication means, each operative to transfer a magnetically encoded pattern on single a master tape to a separate copy tape, and a plurality of cassette loading stations, each adapted to receive and load one of said separate copy tapes into its own cassette after said transfer process.

10. The combined magnetic tape duplicator and cassette loader of claim 1 including a loop-bin accumulator in the tape path between said duplication means and said cassette loading station, said accumulator functioning as a transport speed buffer.

11. The combined magnetic tape duplicator and cassette loader of claim 1, wherein said master and said copy tapes have video information recorded thereon.

12. The combined magnetic tape duplicator and cassette loader of claim 11 wherein said video tape is half-inch video tape.

13. The combined magnetic tape duplicator and cassette loader of claim 11 wherein said video tape is 8-mm video tape.

14. The combined magnetic tape duplicator and cassette loader of claim 1 wherein said cassette is a VHS cassette.

15. The combined magnetic tape duplicator and cassette loader of claim 1 wherein said master and copy tapes are audio tape.

16. A combined magnetic tape duplicator and cassette loader, comprising:

duplication means including a rotating transfer drum and transfer head operative in combination to transfer a magnetically encoded pattern on a mirror-master tape to a copy tape using a contact duplication process;

a master tape transport mechanism operative to transport master tape provided on a supply reel to be received on a take-up reel during said contact duplication process;

a copy tape transport mechanism adapted to receive a plurality of pancake-type copy-tape supply reels, and including a first splicing mechanism operative to splice the tape end from any of said reels onto copy tape previously threaded through said duplication means; and a cassette loader adapted to cyclically receive an empty cassette shell, said loader including a second splicing mechanism operative to cut said copy tape after said duplication process and splice it onto a supply reel leader tape present in said empty cassette shell, wind copy tape from said copy-tape supply reel into said shell, and eject the loaded cassette; and a means to detect a signal previously recorded on said master tape, the cyclic operation of said cassette loader being a function of the detection of said signal.

17. The combined magnetic tape duplicator and cassette loader of claim 16 including a loop-bin accumulator in the tape path between said duplication means and said cassette loading station, said accumulator functioning as a transport speed buffer.

18. In a combined magnetic tape duplicator and cassette loader the method of producing copy-tape cassettes from a master tape, comprising the steps of:

a) providing master tape in the form of a mirror master;

b) providing copy tape on at least one pancake-type supply reel;

c) threading said master and said copy tape through contact duplication means;

d) cueing said master tape for a transfer operation;

e) transferring a magnetically encoded pattern on said master to said copy tape using said contact duplication means; and f) loading copy tape having said magnetically encoded pattern transferred thereupon into a cassette, the path followed by said copy tape from said contact duplication means to said cassette forming a continuous, unbroken tape path.

19. The method of claim 18 wherein the step of providing copy tape further includes the steps of:

splicing said tape from said pancake-type reel onto a copy tape previously threaded through said contact duplication means;

drawing the spliced copy tape through said contact duplication means and collecting said spliced tape onto a take-up reel; and cutting and holding said spliced tape on a splicing mechanism for further splicing onto a cassette supply-reel leader tape.

20. The method of claim 18 wherein the step of loading said copy tape into a cassette includes providing an empty cassette shell with a supply-reel and leader tape attached thereto, splicing said copy tape onto said leader and winding said leader and said tape onto said reel.

* * * * *